United States Patent Office 3,346,185
Patented Oct. 10, 1967

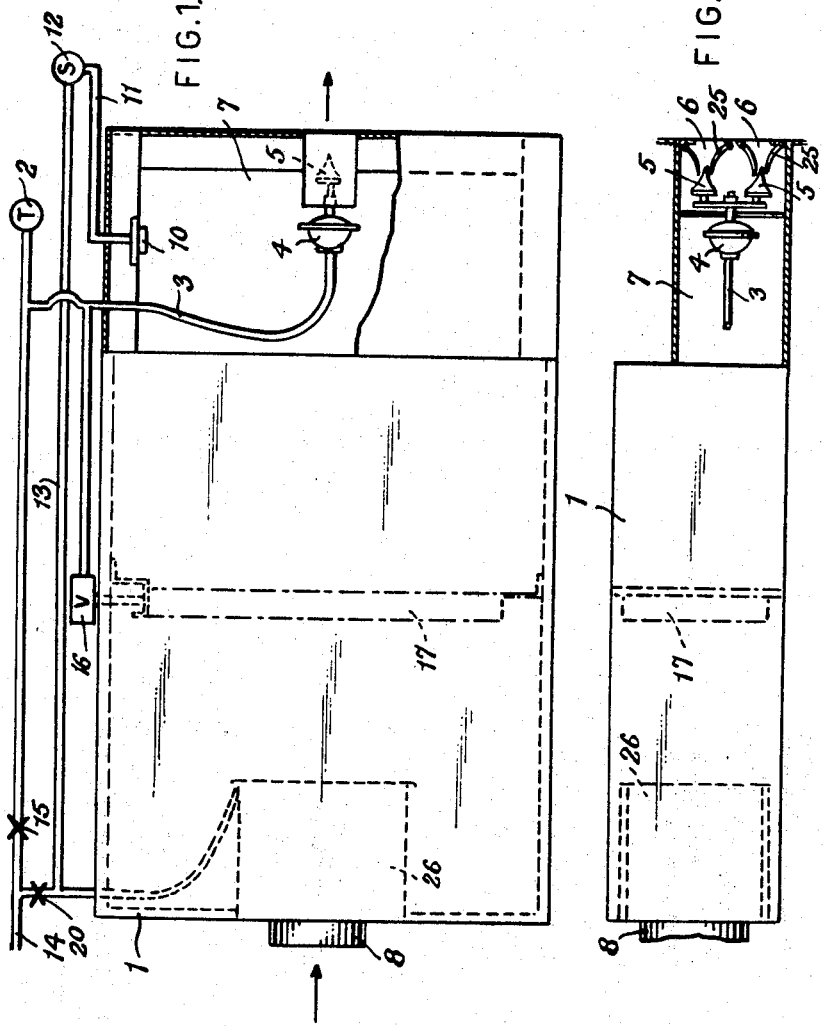

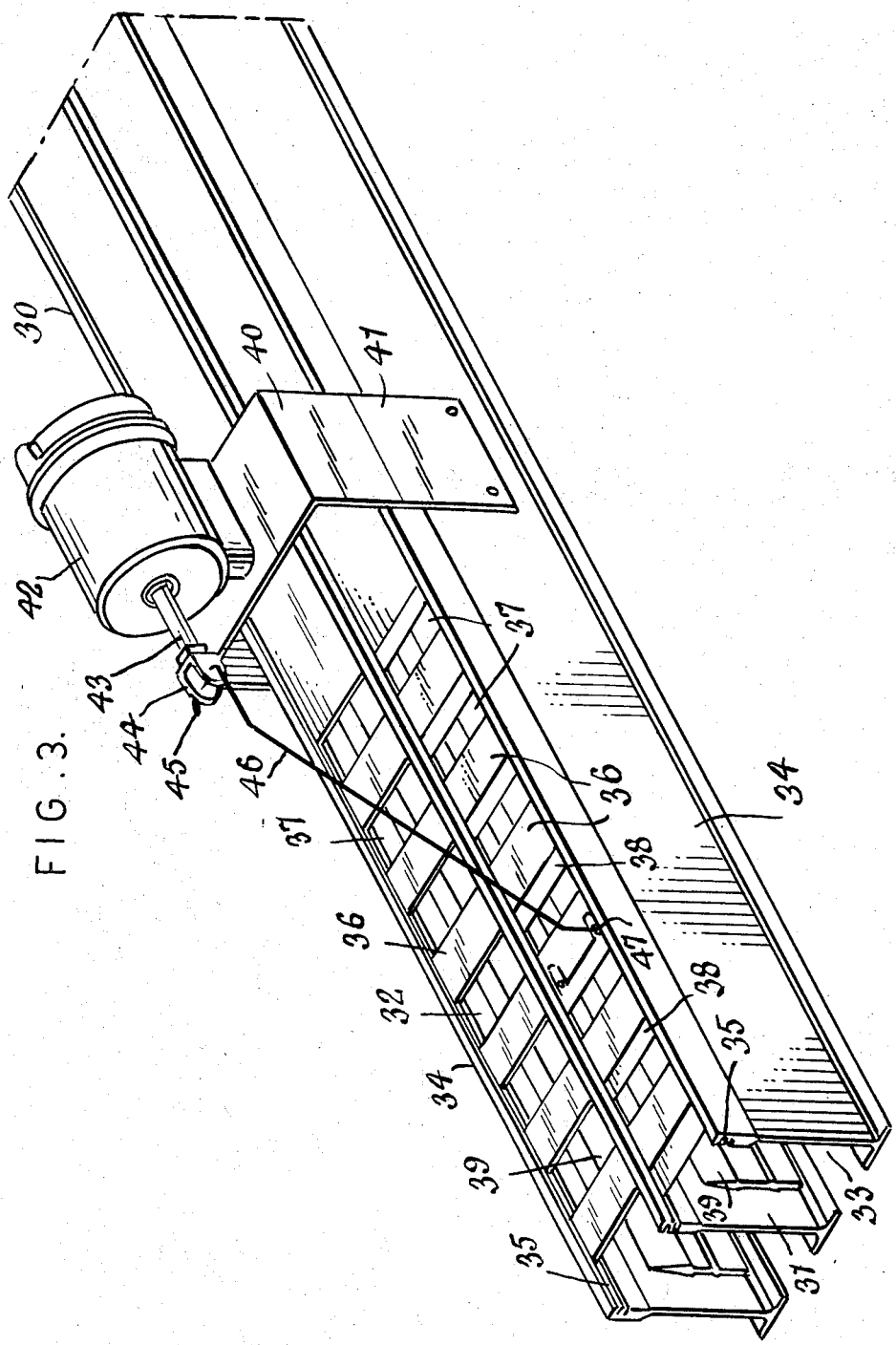

3,346,185
MODULATED VOLUME UNIT AND METHOD OF CONTROLLING THE VOLUME OF AIR FLOW FOR AIR CONDITIONING APPARATUS
Elbert Gordon Stocks, Jr., and Thomas L. Day, Brookfield, Conn., assignors to Connor Engineering Corporation, Danbury, Conn., a corporation of New York
Filed Mar. 20, 1967, Ser. No. 624,383
9 Claims. (Cl. 236—49)

ABSTRACT OF THE DISCLOSURE

In the air conditioning apparatus herein disclosed, there is provided a plenum having an air inlet at which a pneumatically-operated damper is employed. The plenum has an air outlet and located adjacent to the outlet is another pneumatically-operated damper. A pneumatic thermostat is connected to the oulet damper and the thermostat, under temperature control, will result in the outlet damper opening or closing. The thermostat is also connected to the inlet damper. A pressure regulator is located in the plenum and connects through a switch to the inlet damper in a manner to cause throttling of the air flow through the air inlet upon the increase of pressure in the plenum as determined by the pressure regulator.

---

This application is a continuation-in-part of our co-pending application Ser. No. 554,841, filed June 2, 1966 now abandoned.

This invention relates to air conditioning apparatus, and has particular reference to a means by which a thermostatically controlled volume of air is discharged from an air conditioning system regardless of the supply duct pressure.

It is an object of the invention to provide a means of this kind by which the discharged air velocity can be maintained at a constant level throughout the range of volume modulation. Since the velocity discharge does not decrease, but only the area of discharge, a good pattern of air discharge is achieved.

It is an object of the invention to provide an arrangement by means of which extreme conditions in a room can be automatically satisfied and solely by thermostatic control.

It is an object of the invention to provide an arrangement by which the apparatus can be supplied with a heating means.

With these and other objects to be hereinafter set forth in view, we have devised the arrangement of parts to be described and more particularly pointed out in the claims appended hereto.

In the accompanying drawings, wherein an illustrative embodiment of the invention is disclosed, FIG. 1 is a plan view of an apparatus constructed according to the present invention and with a part of the plenum broken away to disclose construction;

FIG. 2 is a side elevational view of the same, and

FIG. 3 is a perspective view of another embodiment.

Referring to the drawings and particularly to FIGS. 1 and 2 thereof, 1 indicates an air chamber or plenum suitably positioned in respect to the room or space to be air conditioned. At 2 is indicated a pneumatic thermostat located at a desired point in the room and connected by an air line 3 to a pneumatic operator 4 located in a part 7 of the plenum and employed for the movement of valves of a damper 5, which valves are moved by the operator 4 to more or less open or close air outlets 6 produced by the adjustable flaps 25, said outlets leading into the room through a grille or other form of air outlet. The operator 4 and the valves of the damper 5 are contained in the part 7 which forms an extension of the plenum 1. The arrangement thus described constitutes the air outlet and the damper therefor.

At the opposite end of the plenum 1 is provided an air outlet 8 having a pneumatically controlled damper 26 which can be of a known form. Contained within the plenum 1 between the inlet 8 and the outlet 6 is a heating coil 17 which can be of the hot water or electrical kind.

The general purpose of the arrangement disclosed is to provide a thermostatically-modulated control of the air volume that is discharged from an air conditioning system regardless of the supply-duct pressure. The described arrangement achieves this result by the separation of the functions of the inlet damper and the discharge damper.

The inlet damper 26, which can be of a known pneumatically operated type and preferably, but not necessarily, a high pressure type, automatically maintains a constant static pressure within the plenum regardless of the air volume that is discharged, or the inlet duct pressure. An example of such a valve is shown in Patent No. 3,011,512 dated Dec. 5, 1961. Because the plenum is maintained at this constant low pressure, the action of the discharge damper 5 is maintained at a limited noise level and the maximum and minimum damper openings furnish definite and predictable rates of air discharge between which the modulating pneumatic thermostat 2 can select the precise rate of air delivery required to meet the needs of the space that is being air conditioned.

When the space to be air conditioned requires a full or maximum cooling, the thermostat has a zero or very low pressure exerted on the pneumatic valve operator 4 and the variable orifice discharge openings are wide open. This results in an air flow which relates to a pressure drop in the portion 7 of the plenum, which in turn is controlled by a regulator 10 located in this part of the plenum and connected by the line 11 to an off-and-on switch shown at 12 and from which a line 13 extends to the air supply pipe of 15 p.s.i. indicated at 14. A restrictor 20 is located in the line between the switch 12 and the main line 14. This regulator may be pre-set at the factory for the maximum of air flow to be delivered at a constant rate.

When the room or space to be cooled to the required degree reaches that point and the thermostat is satisfied, the thermostat will gradually build up pressure through the branch line 3 to the pneumatic operator 4 so that the operator 4 causes the valves of the damper 5 to throttle the discharge outlets 6. As this operation progresses the pressure in the portion 7 of the plenum tends to increase and which is sensed by the regulator 10 so that the same sends a signal to the switch 12 through the line 11 causing a throttling movement of the inlet damper 26 thereby reducing the extent of the air flow into the plenum.

This operation can continue until the thermostat requires a heating condition to an extent that it would cause an increase in pressure to a maximum degree and close the outlet 6 to a maximum extent and the regulator 10 will maintain a constant static pressure in the plenum by throttling the damper 26 at the inlet opening. At this point, the thermostat, calling for temperature rise, would act on the valve shown at 16 and turn on hot water or otherwise arrange for heating by the re-heater coil 17, thereby heating the air passing through the plenum. The on-and-off switch must be in its "on" position to allow the above operation to take place.

When the switch 12 is turned to "off" position, the air entering from the line 14 will not pass through the switch and will pass through the restrictor 20 and will close the inlet damper 26 thereby closing off the air flow through the unit.

An advantage of the described unit is that the discharged air velocity can be maintained constant throughout the range of volume modulation. This can be accomplished by having a pivoted vanes 25 of the discharge damper arranged to serve as a grille at the discharge opening. A good pattern of air discharge will be achieved even at a minimum air flow since the velocity of discharge does not decrease but only the area of discharge is reduced. Some air motion will be maintained at minimum air flow which will better serve the described space and also activate the controlling thermostat.

Another advantage of the described apparatus is that extreme room conditions can be met automatically. In such case the discharge pattern is varied from maximum to minimum so that the discharge air is automatically altered in direction and pattern to best fit the space. Directional turning vanes can be placed in the upper opening of a two-opening discharge grille. At maximum flow these will have no effect, since narrow slot openings negate any lateral effect. At maximum flow however, the vanes are set wide apart and the lateral movement from the directional vanes continues through, giving direction to the discharged air pattern. In this way, a straight jet pattern at minimum air flow and a divergent jet pattern at maximum air flow can be obtained. Such an automatic variation in air pattern is helpful in a room that is served by a high-up side wall discharge grille.

Another advantage obtained is the ability to sequence the volume control with re-heat, either electric or hot water. If cool air is supplied, the effect of any heat is increased at minimum air flow, since a lesser quantity of cool air must be heated in order to reach room temperature before being imparted heat for the condition space.

In the embodiment of the invention shown in FIG. 3, there is provided an elongated plenum 30 divided longitudinally by a partition 31 into two channels indicated respectively at 32 and 33. The walls 34 of the plenum and the partition are grooved at the top as indicated at 35. Said grooves receive upper fixed and spaced-apart damper plates 36 defining air outlet spaces 37 between them.

Slidably mounted in the lower of the grooves 35 below the fixed plates 36 is a plurality of movable damper plates 38, these plates 38 being adjustable relatively to the fixed plates 36 so that the openings or spaces 37 can be either fully or partially closed according to air requirements.

The adjustable plates 38 are connected together in their required spaced-apart relationship by means of bars 39 so that the slidable plates are moved in unison. Mounted on a U-shaped bracket 40, which has its legs 41 fastened to the walls of the plenum, is a pneumatic motor 42 having its operating shaft 43 provided with a clevis 44 connected to the offset end 45 of a rod 46, which has its opposite end attached at 47 to one of the slidable or adjustable plates. It is obvious that by the operation of the motor 42 as required times and for required periods, the plates 38 will be adjusted relatively to the fixed plates 36 and the air outlet spaces regulated accordingly. The operation of the motor can be thermostatically controlled to open and close the outlets as required.

In FIG. 3 the motor is shown as operating the plates 38 for only one of the channels in the plenum. The plates in the other channel can, if desired, be manually adjusted or they can be connected to the motor for movement thereby.

The arrangement of the thermostat, heating means and the other elements discussed in connection with the structure of FIGS. 1 and 2 can be used in connection with the arrangement of FIG. 3, with results obtained as herein stated.

Having thus described embodiments of the invention, it is obvious that the same is not to be restricted thereto, but is broad enough to cover all structures coming within the scope of the annexed claims.

What we claim is:

1. In an air conditioning apparatus, a housing constituting a plenum having an air inlet and an air outlet, an air-pressure controlled damper at the inlet and at the outlet, a pneumatic thermostat arranged in a line leading from a source of air under pressure, said thermostat being operatively coupled to the damper at the outlet to thereby control the opening or closing of the same, regulating means in the plenum, said regulating means being connected to the damper at the inlet and effective to throttle the said damper to hereby reduce the air volume entering the plenum through the inlet.

2. In an apparatus according to claim 1, including heating means contained in the plenum between the inlet and outlet openings and connected to the thermostat, a valve for controlling heating fluid, said valve being controlled by the thermostat.

3. In an air conditioning apparatus, a plenum having an air inlet, a pneumatically-operated damper at said inlet, an air outlet, a pneumatically-operated damper at said outlet, a pneumatic thermostat connected to the outlet damper and effective under temperature control to open or close said damper, the thermostat being also connected to the inlet damper, a pressure regulator in the plenum and connected through a switch to the inlet damper and effective to throttle the air flow through the inlet upon increase of pressure in the plenum as determined by the regulator.

4. In an air conditioning apparatus, a plenum, an inlet opening at one end thereof, a damper operative at said opening, an air outlet remote from the inlet, a pneumatically-controlled damper at said inlet, a pneumatic thermostat connected to the outlet damper in a manner to close or open the same under temperature change, a connection between the thermostat and the inlet damper, a regulator in the plenum, and a line establishing a connection between the regulator and the inlet damper, with a switch interposed in the line between the regulator and the inlet damper.

5. In an air conditioning apparatus according to claim 4, including a heater, a valve connected thereto and a connection between the valve and a point in the line between the thermostat and the outlet damper.

6. In an air conditioning apparatus, a plenum chamber having an air discharge opening, a thermostat, a damper for the throttling of the discharge opening, the chamber containing a regulator, a connection between the damper and the thermostat in a manner to cause opening or closing movements of the damper under temperature changes indicated by the thermostat, the plenum having an air inlet, a damper at said inlet, a connection between the latter damper and the regulator to cause throttling of the latter damper upon increase of pressure in the plenum as determined by the regulator.

7. The method of controlling the volume of air flow through a plenum provided with damper controls at inlet and outlet openings comprising, regulating the control at the outlet opening by means of a pneumatic thermostat to maintain said control open until air pressure in the plenum increases to a predetermined extent as determined by a regulator in the plenum and then by operation of means controlled by the thermostat, throttling the air flow at the inlet.

8. In an air conditioning apparatus, an elongated plenum having an air outlet, fixed spaced-apart plates extending across the outlet, said plates defining openings between them, a plurality of slidable plates in the outlet and movable to or from the fixed plates to thereby reduce the effective sizes of the openings or to close said openings, means coupling the slidable plates together so that they are slidable as a unit, a motor coupled to the connected plates to slidably adjust the same, and thermostatic means for controlling the operation of the motor.

9. In an air conditioning apparatus as set forth in claim 8, wherein the plenum is divided into two channels, the slidable plates in one of the channels being activated by the motor and the slidable plates in the other channel being mounted for manual adjustment.

No references cited.

WILLIAM J. WYE, *Primary Examiner.*